Nov. 6, 1945.  C. J. DAVIES  2,388,392
IRONING APPARATUS
Original Filed March 11, 1940    3 Sheets-Sheet 1
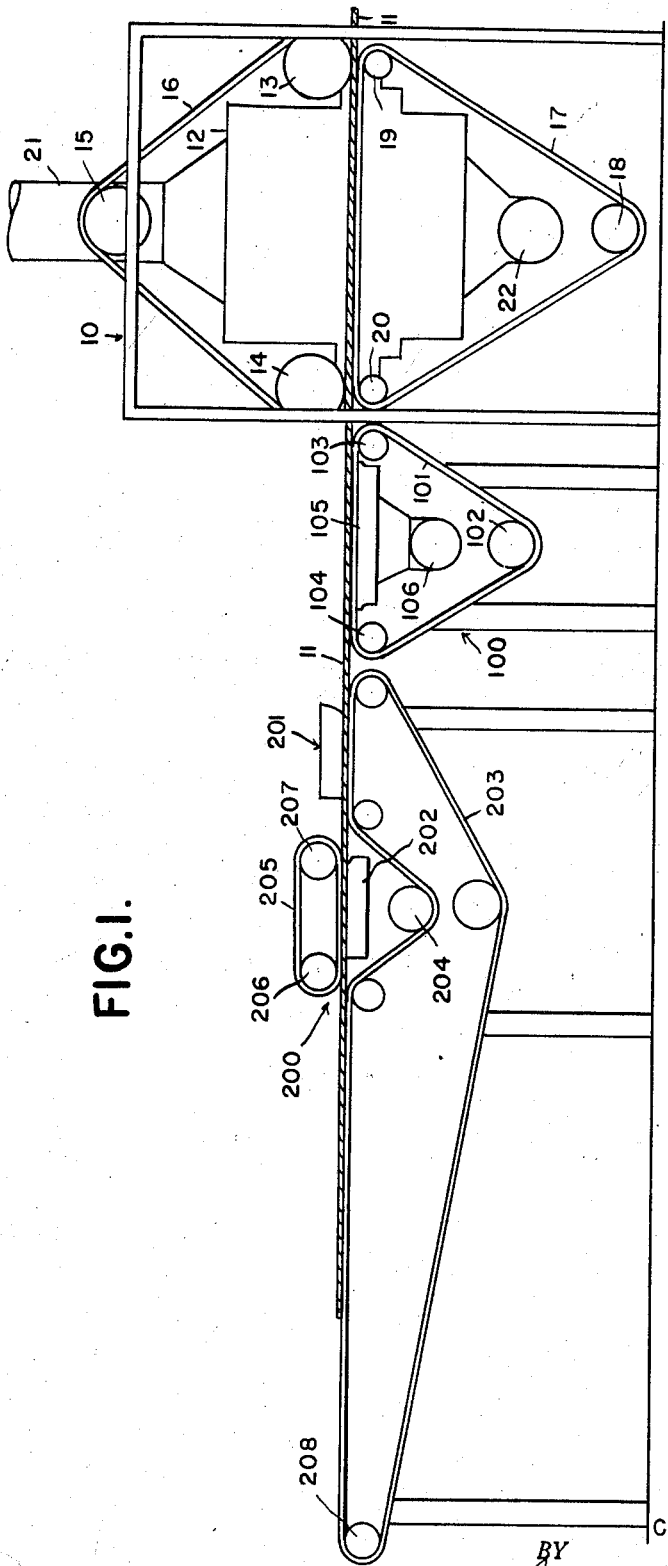
FIG.I.
INVENTOR.
CLARENCE J. DAVIES
BY
ATTORNEYS Nov. 6, 1945.   C. J. DAVIES   2,388,392
IRONING APPARATUS
Original Filed March 11, 1940   3 Sheets-Sheet 2
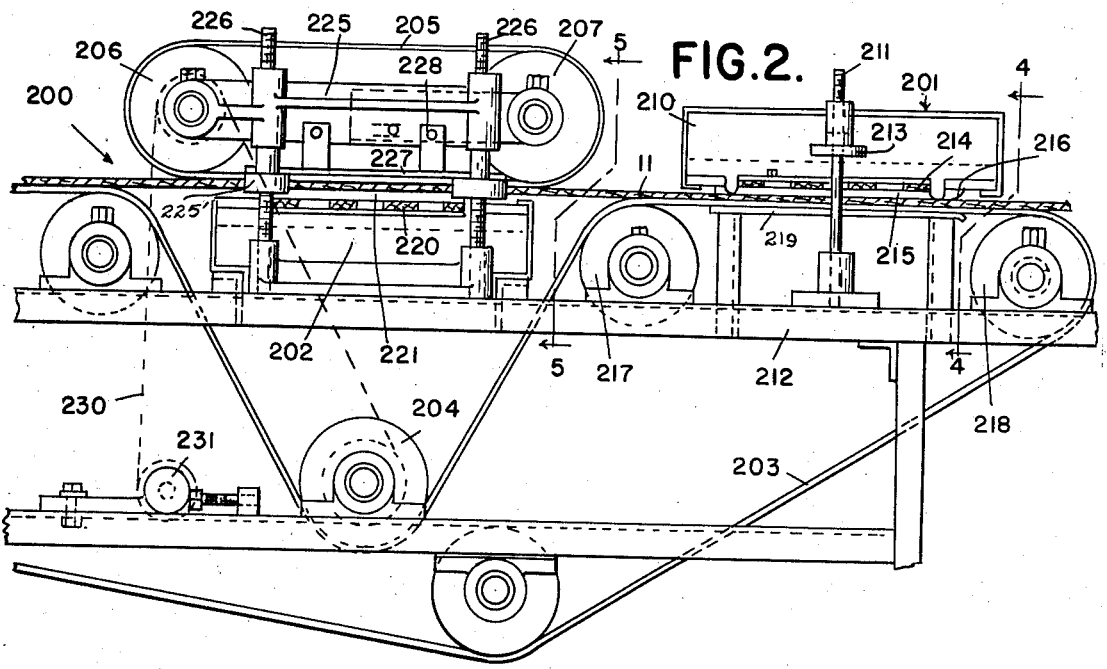
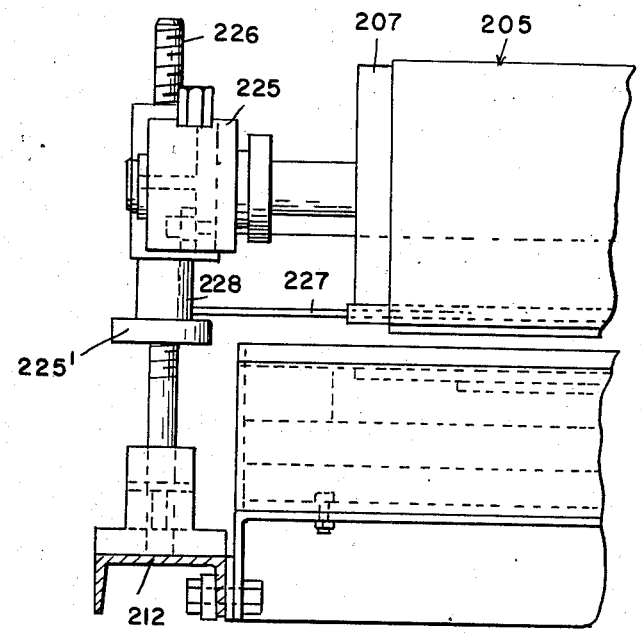
INVENTOR.
CLARENCE J. DAVIES
BY
*Whittemore, Hulbert & Belknap*
ATTORNEYS Nov. 6, 1945.   C. J. DAVIES   2,388,392
IRONING APPARATUS
Original Filed March 11, 1940   3 Sheets-Sheet 3
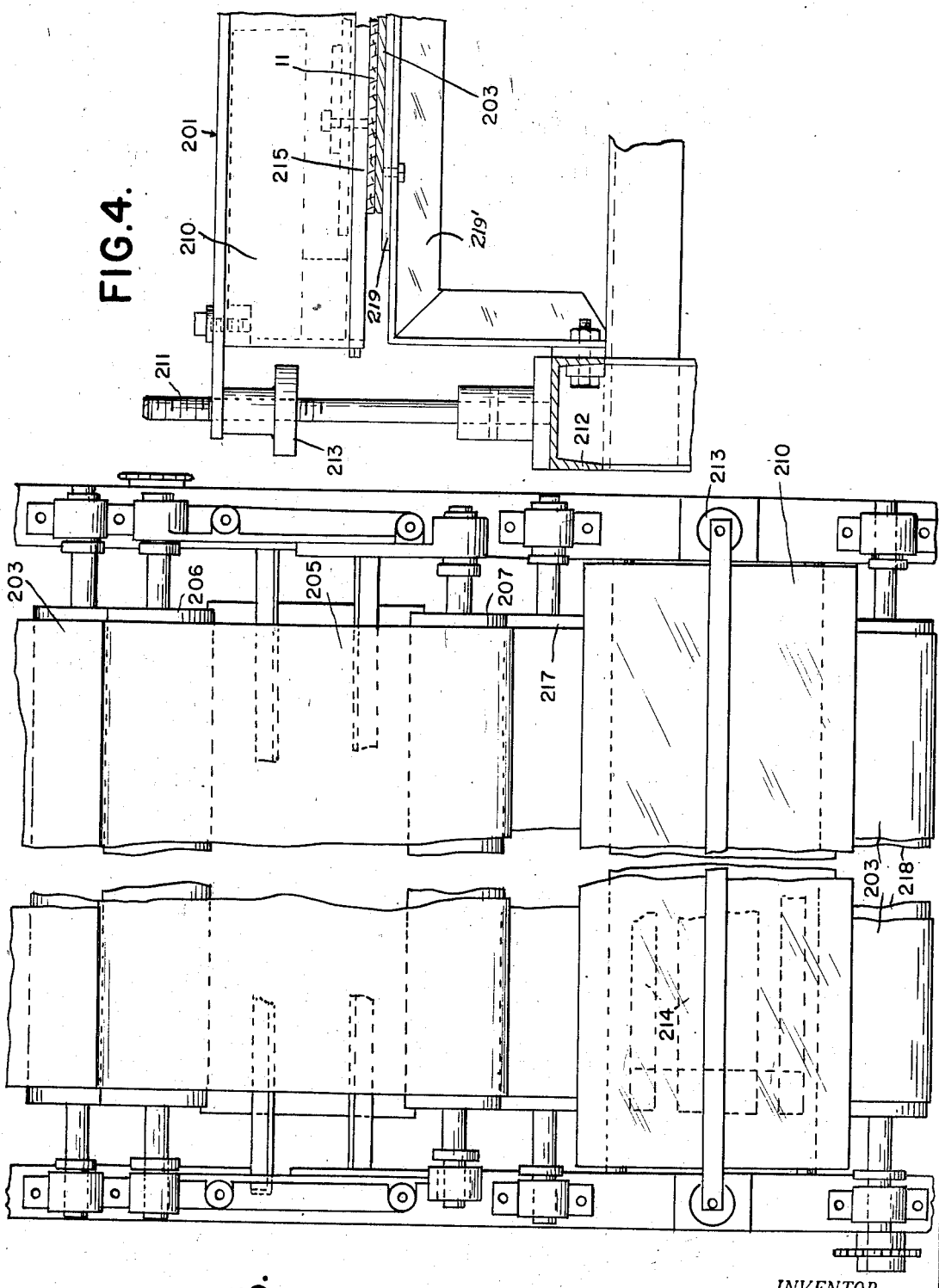
INVENTOR.
CLARENCE J. DAVIES
BY
ATTORNEYS Patented Nov. 6, 1945

2,388,392

UNITED STATES PATENT OFFICE 2,388,392

IRONING APPARATUS

Clarence J. Davies, Detroit, Mich., assignor to National Automotive Fibres, Inc., Detroit, Mich., a corporation of Delaware Original application March 11, 1940, Serial No. 323,430, now Patent No. 2,383,849, dated August 28, 1945. Divided and this application July 26, 1943, Serial No. 496,206

3 Claims. (Cl. 154—27)

This invention relates generally to ironing apparatus such as that adapted to smooth the surface of fibrous sheet material having a thermoplastic binder therein and constitutes a division of my application filed March 11, 1940, bearing Serial No. 323,430 and matured into Patent No. 2,383,849 of August 28, 1945.

According to the present invention a fibrous insulating material of sheet-like construction, having high insulating qualities and being comparatively soft and resilient while at the same time having surface characteristics such that it can withstand rough handling, is produced. Briefly described and according to the method at present preferred, the insulating material is produced by interspersing a dry, powdered thermoplastic binder substantially uniformly through a relatively thick web of loosely aggregated fibrous material, such for example as cotton. The web of fibrous material is heated by positively forcing heated air therethrough in a manner to soften the thermoplastic particles. Each thermoplastic particle serves to bind together the adjacent fibers with the result that the entire web has a multiplicity of zones wherein the fibrous materials are bonded together.

After softening of the thermoplastic material the web is compressed to the desired thickness, preferably leaving the same comparatively soft and resilient. Since the thermoplastic binder material is soft at this time, the web tends to remain at the thickness to which it was compressed. Further operations are performed to improve the surface of the web in a manner to increase its smoothness and its strength. These subsequent operations may take numerous forms, and in its simplest form comprises the step of smoothing the surface of the web while the thermoplastic binder is still in a soft or plastic condition. According to the preferred embodiment, the web after compression is cooled by circulation of cooling air therethrough and thereabout in a manner to cause the thermoplastic material to set. Subsequently the material is treated by providing sliding contact between one surface of the web and a smooth heated surface. This operation is referred to herein as "ironing" and serves the purpose of first softening the thermoplastic material adjacent the surface without softening the thermoplastic material within the body of the web. The sliding contact between the surface of the web and the surface of the ironing element smooths the surface and compacts the fibrous material at the surface without compacting the fibers in the interior of the web where the thermoplastic binder has already set.

With the foregoing general remarks in view, it is accordingly an object of the present invention to produce a new article of manufacture in the form of a fibrous sheet material having smooth, compacted surfaces.

It is a further object of the present invention to provide a sheet material composed of partly compressed fibrous material retained in compressed state by means of a binder and having surfaces substantially smooth and compacted and having an increased amount of binder therein.

More specifically it is a further object of the present invention to produce fibrous material of the character described by a method which includes the steps of heating and smoothing the surface of a fibrous sheet material having a thermoplastic binder therein.

More specifically it is an object of the present invention to provide an apparatus for producing the product described, in which means are provided for advancing a web of fibrous material containing a thermoplastic binder in sliding contact past a heated smooth element for the purpose of smoothing or "ironing" the surface of the web.

It is a further object of the present invention to provide an apparatus for producing the product described, which comprises means for continuously advancing a fibrous web containing a thermoplastic binder, means for compressing the web to a desired degree, means for causing the binder to set, and means effective thereafter for softening the binder through a shallow zone adjacent a surface of the web, in conjunction with means for smoothing the surface of the web.

Other objects of the invention will be apparent as the description proceeds, and when taken in conjunction with the accompanying drawings wherein:

Figure 1 is a more or less diagrammatic view illustrating the complete apparatus for treating the binder impregnated web;

Figure 2 is an enlarged side elevation of the ironing structure;

Figure 3 is a top plan view of the ironing structure shown in Figure 2;

Figure 4 is a section on the line 4—4 of Figure 2; and

Figure 5 is a section on the line 5—5 of Figure 2.

Referring now to the drawings, and more particularly to Figure 1 thereof, 10 is a heating device for heating and softening the thermoplastic material dispersed in powdered form through the web 11 of fibrous material, and 12 is a sealing chamber which constitutes a part of said heating device. Rolls 13, 14 and 15 are provided for carrying bands or belts 16 adapted to contact the edges of the fibrous web and to seal the same. A foraminous conveyor belt 17 is carried by rolls 18, 19 and 20 for supporting the fibrous web and for permitting the forced circulation of heated air therethrough. Air from a suitable blower (not shown) is forced through a conduit 21 to the sealing chamber 12 and returns through a conduit 22 to the blower 23. The fibrous web enters the chamber 12 between the rolls 13 and 19 and leaves the chamber between the rolls 14 and 20. Preferably the rolls 14 and 20 are close enough to each other to compress the web a desired degree.

After having been compressed to a desired degree, the web passes next to a cooling device indicated generally at 100, which has a supporting conveyor belt 101 carried by rolls 102, 103 and 104. The belt 101 advances the fibrous material 11 over a box 105 connected to a suction conduit 106 adapted to draw air downwardly through and around the web 11 to cool the same and to cause the thermoplastic binder therein to set.

After cooling, the fibrous web 11 advances past a surfacing apparatus indicated generally at 200, which comprises a first ironer 201 and a second ironer 202. As the material advances beneath the first ironer 201 it is supported by suitable means, not shown in this figure, engaging a conveyor belt 203 which causes the fibrous material to be held in light but firm friction contact with the lower smooth surface of the ironer 201.

The conveyor belt 203 drops away from the plane of advance of the fibrous web 11 around a roll 204 to provide space for the second ironer 202. A second short conveyor belt 205 is mounted between rolls 206 and 207 which causes the fibrous material to be positively advanced in light but firm pressure contact against the upper surface of the heated iron 202. The completed material is advanced on the conveyor 203 toward the end roll 208 at which time it is in completely finished condition.

Referring now more particularly to Figure 2, I have illustrated the ironing apparatus as comprising an upper ironer 201 and a lower ironer 202. The ironer 201 comprises a box 210 supported at its ends by a pair of uprights 211 carried by the frame 212. Suitable threaded adjusting means 213 are provided for varying the height of the ironer 201. The box 210 is provided with insulating material and carries heating elements indicated generally at 214. Carried at the lower side of the box 210 is the ironing element 215, which preferably is a highly polished, smooth metal plate having a rounded end 216. The conveyor belt 203 intermediate the rolls 217 and 218 is supported by a plate 219 so that the fibrous material 11 as it is advanced underneath the ironing element 215 is retained in firm but light pressure contact therewith. The plate 219, as best seen in Figure 4, is carried by an angle iron 219', bolted or otherwise secured to the frame 212. Preferably the temperature of the ironing element 215 is automatically kept constant and at such a level that the thermoplastic material at the upper surface of the web 11 and to a shallow depth therein is again softened. The pressures employed are sufficient to compress the fibrous material through the heated zone in which the thermoplastic material has again been softened. The major body portion of the fibrous material in which the thermoplastic binder is not again softened by the ironing element 215 is not substantially compressed. It is found that this operation gives a much smoother surface to the completed material than would otherwise be possible, and in addition it substantially strengthens the surface. The reason for this is readily apparent when it is considered that the surface produced by this operation comprises what might be called a thin shell of substantially compressed fibrous material having the thermoplastic binder concentrated therein due to the compression of the surface layer.

After the material has advanced past the first ironer 201 it then passes the second ironer 202, which is substantially identical. The ironer 202 has heating elements 220, identical with the heating element 214 carried in the box 210 of the first ironer 201. An ironing element 221 is carried in heat transfer relation to the heating elements 220 and is heated thereby. Ironing element 221 is identical with the element 215 previously described.

Means are provided for applying a predetermined light pressure to the fibrous material 11 as it passes the second ironer 202 and this comprises the rolls 206 and 207 and a conveyor belt 205 therebetween. The rolls 206 and 207 are supported by a frame 225, adjustably carried by the uprights 226 located at opposite sides of the advancing web. Vertical adjustment of the frame 225 is provided for by threaded adjusting means 225', threaded onto the uprights 226. Vertical adjustment of the frame 225 varies the pressure which may be applied to the fibrous material. The frame 225 carries a depending plate 227 by suitable brackets 228 and the plate 227 contacts the belt 205 which is advanced at the same speed as the fibrous material 11. In Figure 2 a chain drive for the roll 206 is indicated at 230, the chain passing around a suitable tightening sprocket 231.

While I have illustrated and described several specific embodiments of my invention, it will be apparent to those skilled in the art that various additions, modifications, omissions, combinations and substitutions may be made which will be within the spirit and scope of my invention as defined by the appended claims.

What I claim as my invention is:

1. Apparatus for smoothing the lower surface of fibrous sheet material as the latter is advanced in a predetermined direction, comprising a frame, an ironing plate fixed to said frame and having an upper smooth heated ironing surface engaging and forming a seat for the lower surface of said advancing fibrous sheet material, and means for maintaining the lower surface of said fibrous sheet material in firm but light pressure ironing contact with said heated ironing surface, including an endless belt having a flight disposed over and in surface to surface engagement with the fibrous sheet material on said ironing surface, rolls for said belt, a vertically adjustable support for said rolls mounted on said frame, a pressure plate suspended from said support above and engaging the back of said flight of the belt, and means for adjusting said support vertically relative to said ironing plate to vary the position of said flight of the belt and said pressure plate therefor relative to the advancing fibrous sheet material.

2. Apparatus for smoothing the lower surface of a fibrous sheet as the latter is advanced in a predetermined direction, comprising a frame, an ironing plate rigid with said frame and having an upper smooth heated ironing surface engaging and forming a seat for an advancing fibrous sheet, and means for maintaining the lower surface of said advancing sheet in firm but light pressure ironing contact with said heated ironing surface, including uprights on said frame at opposite sides of said ironing plate, a pressure plate above said ironing surface, a support for said pressure plate adjustably mounted on said uprights, rolls carried by said support at opposite edges of said pressure plate, and an endless belt reeved on said rolls and having a flight extending between and disposed in surface to surface engagement with the pressure plate and fibrous sheet so as to transfer to the advancing fibrous sheet the pressure exerted by said pressure plate.

3. Apparatus for smoothing a surface of fibrous sheet material as the latter is advanced in a predetermined direction, comprising a relatively fixed ironing element having an elongated ironing surface, means for advancing sheet material to be ironed over the ironing surface of said ironing element, including an endless conveyor having a flight above and substantially parallel to said ironing surface, a vertically adjustable support for said endless conveyor, and a pressure plate carried by said support in surface to surface engagement with the flight of said conveyor, and means for adjusting said support and pressure plate so that the flight aforesaid of said conveyor will maintain the advancing fibrous sheet material in firm but light pressure ironing contact with the ironing surface of said ironing element.

CLARENCE J. DAVIES.